US011861990B2

(12) United States Patent
Haishima

(10) Patent No.: US 11,861,990 B2
(45) Date of Patent: Jan. 2, 2024

(54) MANAGEMENT SERVER

(71) Applicant: Universal Entertainment Corporation, Tokyo (JP)

(72) Inventor: Jun Haishima, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 191 days.

(21) Appl. No.: 17/428,165

(22) PCT Filed: Jan. 30, 2020

(86) PCT No.: PCT/JP2020/003352

§ 371 (c)(1),
(2) Date: Aug. 3, 2021

(87) PCT Pub. No.: WO2020/162302

PCT Pub. Date: Aug. 13, 2020

(65) Prior Publication Data

US 2022/0108590 A1 Apr. 7, 2022

(30) Foreign Application Priority Data

Feb. 4, 2019 (JP) ................................ 2019-018027

(51) Int. Cl.
*G07D 11/22* (2019.01)
*G07F 17/32* (2006.01)
*G07F 17/34* (2006.01)

(52) U.S. Cl.
CPC ............. *G07F 17/34* (2013.01); *G07D 11/22* (2019.01); *G07F 17/3227* (2013.01); *G07F 17/3246* (2013.01)

(58) Field of Classification Search
CPC ...................................................... G07F 17/34
See application file for complete search history.

(56) References Cited

U.S. PATENT DOCUMENTS

2015/0038217 A1 2/2015 Okada
2017/0287256 A1* 10/2017 Takeda .................. B65H 43/04

FOREIGN PATENT DOCUMENTS

JP 2008-140122 6/2008
JP 2013-127805 6/2013
(Continued)

*Primary Examiner* — Robert T Clarke, Jr.
(74) *Attorney, Agent, or Firm* — Simpson & Simpson, PLLC; S. Peter Konzel

(57) ABSTRACT

An object of the present invention is to provide a management server which makes it possible to uniformly and rapidly limit the usage of a predetermined currency in a case in which currency handling systems including currency reading devices in each of which a wide variety of currencies are available are used. A slot machine management server 1 and a casino management system 2 manage slot machines 4S including currency handling systems 100 in each of which a wide variety of currencies are available. For example, when a currency used at any one of currency reading devices 201 of slot machines 4S provided in areas A to D is determined as a $100 banknote with limited usage after a center controller 101 of the slot machine management server 1 receives information which limits usage of the $100 banknote in the areas A to D of a map of a gaming facility 15 from an input unit 104, the center controller 101 of the slot machine management server 1 sends a command to the currency reading device 201 through a PTS terminal 700. The command causes a process which discharges a used banknote T ($100 banknote) to be performed.

5 Claims, 14 Drawing Sheets

(56) References Cited

FOREIGN PATENT DOCUMENTS

| | | |
|---|---|---|
| JP | 2017-134580 | 8/2017 |
| JP | 2017-176662 | 10/2017 |

* cited by examiner

MANAGEMENT SERVER

TECHNICAL FIELD

The present invention relates to a management server which manages a currency handling system including a currency reading device in which a wide variety of currencies are available.

BACKGROUND ART

A known currency reading device (Bill Validator) provided at a gaming machine receives only currency of the country or region in which the gaming machine is provided, and is able to distinguish the face value (see Patent Literatures 1 to 2).

However, with increase of travelers and sojourners from foreign countries, gaming machines are increasingly required to accept foreign currencies. As such, gaming machines are required to accept foreign currencies.

CITATION LIST

Patent Literatures

[PTL 1] Japanese Unexamined Patent Publication No. 2013-127805

[PTL 2] Japanese Unexamined Patent Publication No. 2012-141897

SUMMARY OF INVENTION

Technical Problem

However, accepting a wide variety of foreign currencies increases risks. Examples of the risks include circulation of counterfeit bills, and a foreign exchange risk due to excessively high inflation or deflation. In order to deal with these risks, the acceptance of a predetermined foreign currency may be stopped or limited after obtaining information (counterfeit bill information, inflation information, etc.) of the risks of the foreign currency. However, if a wide variety of foreign currencies are used in this case, management staffs of gaming machines are not accustomed to deal with foreign currencies and thus cannot deal with them uniformly and swiftly.

An object of the present invention is to provide a management server which makes it possible to solve the above-described problems.

Solution to Problem

The present invention is a management server which is connected to, through a communication line, at least one currency handling system including a currency reading device in which a wide variety of currencies are available the management server includes:

an input unit configured to receive information from an outside;

a transmitter configured to send a command to the currency handling systems; and a controller which is programmed to perform a predetermined process, wherein, in a case in which a currency read by the currency reading device is a predetermined currency with limited usage after the controller receives information which limits usage of the predetermined currency from the input unit, the controller sends a command to the at least one currency handling system from the transmitter, the command causing the at least one currency handling system to limit the usage of the predetermined currency.

By the above-described structure, even when currency handling systems are used and information of circulation of a counterfeit bill of a predetermined currency is obtained, a limit such as stop of usage of the predetermined currency is uniformly and rapidly performed. The currency handling systems include currency reading devices in each of which a wide variety of currencies are available.

The present invention is the management server, and in a case in which a money type of the currency which is read by the currency reading device is a predetermined money type of a predetermined currency with limited usage after the controller receives information which limits usage of the predetermined money type of the predetermined currency from the input unit, the controller sends a command to the at least one currency handling system from the transmitter, the command causing the at least one currency handling system to limit the usage of the predetermined money type of the predetermined currency to be performed.

By the above-described structure, even when the currency handling systems are used and information of circulation of a counterfeit bill of a predetermined money type of a predetermined currency is obtained, a limit such as stop of usage of only the predetermined money type of the predetermined currency is uniformly and rapidly performed. In this regard, the currency handling systems include the currency reading devices in each of which a wide variety of currencies are available.

PREFERRED EMBODIMENT OF INVENTION

Embodiment

Figure 1:
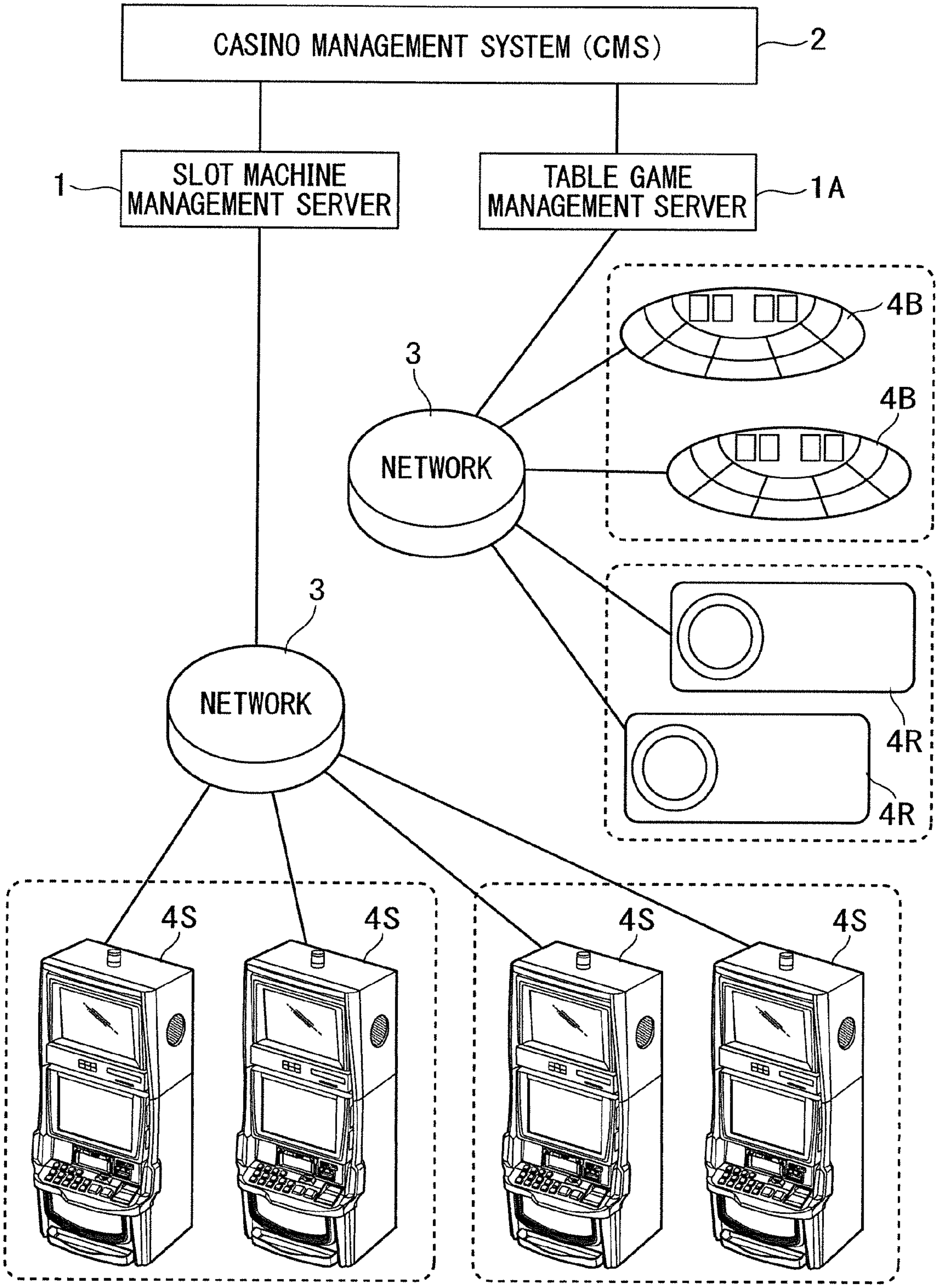
FIG. 1 illustrates a network environment of a casino system.

The following will describe a slot machine management server 1 and a casino management system 2 of the present embodiment with reference to figures. In this regard, the slot machine management server 1 and the casino management system 2 correspond to a management server of the present invention, and are connected through a communication line with a currency handling system 100 (currency reading device 201 and PTS terminal 700) mounted at a slot machine 4S.

(Casino System)

As shown in FIG. 1, the slot machine management server 1 is connected with slot machines 4S (gaming machines 4) through a network 3 (communication lines). In other words, the slot machine management server 1 mainly plays a role of managing the slot machines 4S. The slot machine management server 1 itself is connected with a casino management system 2 (CMS) which manages operation of the entire casino. With the casino management system 2, a table game management server 1A is also connected. The table game management server 1A plays a role of managing table games (total sales, etc.) such as baccarat game tables 4B, roulette game machines 4R, and poker game machines 4P, which correspond to other gaming machines 4. In this regard, the casino management system 2 itself may be connected with the outside through communication lines (the Internet, etc.).

The gaming machine 4 includes a device which is able to perform or support a game (e.g., support of progress of a game and support of calculation of a payout). In the game, a payout may be awarded based on a betted gaming value and a game result. The gaming machine 4 further includes a device which is embedded in or provided to be adjacent to a playing table of baccarat or porker, which is a game controlled by a human player. In this regard, the gaming value is electrically valuable information in which a currency amount is exchanged into electronic money, etc. The gaming value in the disclosure is not limited to this, and for example a gaming medium such as a medal, a token, a coin, or a ticket or the like may be used. The ticket is not particularly limited, and for example, a barcoded ticket may be used. The barcoded ticket has data of, e.g., a credit amount in the form of bar code. Alternatively, the gaming value may be a game point which does not include valuable information.

Figure 2:
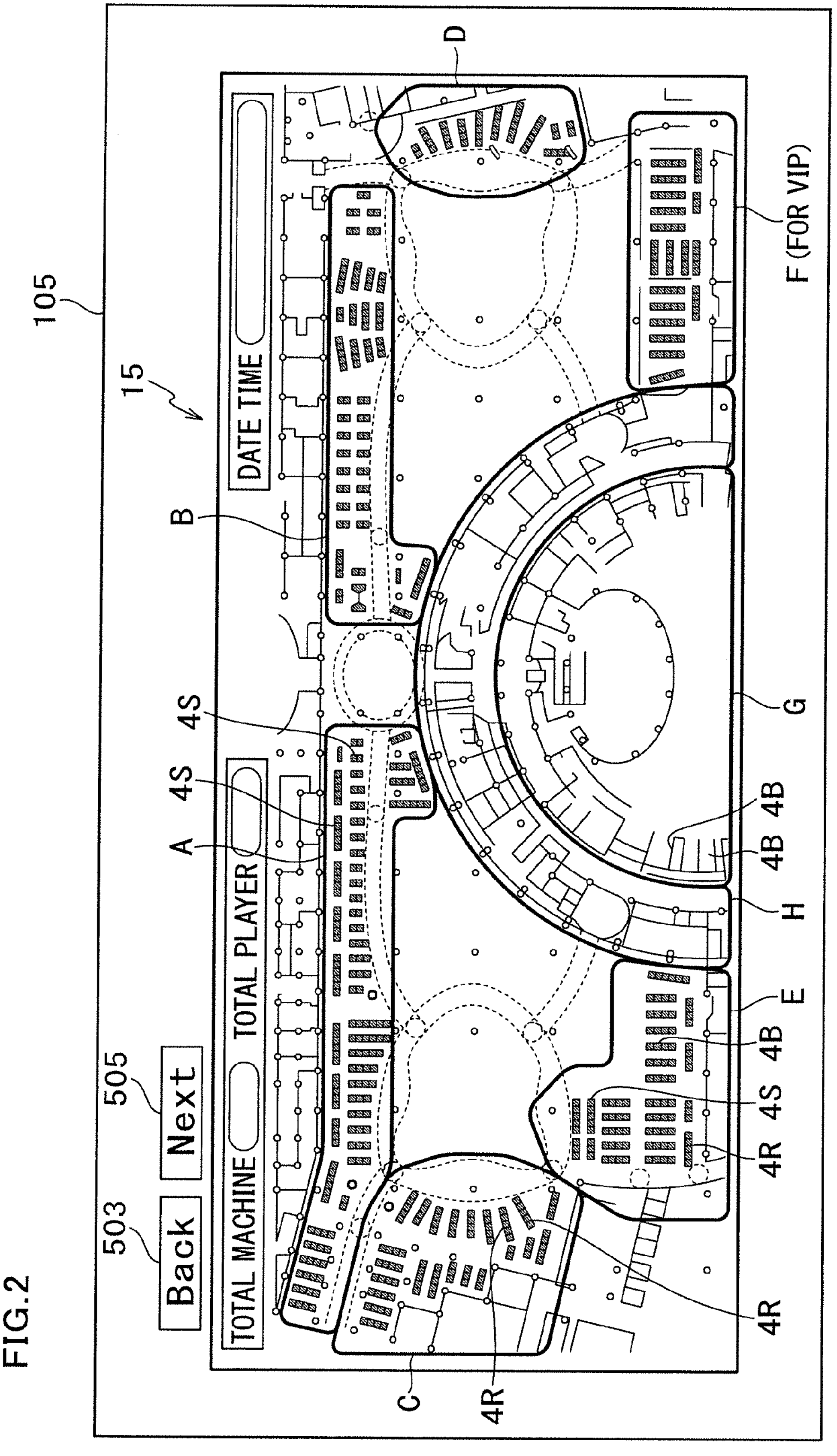
FIG. 2 illustrates areas A to H which are associated with gaming machines provided at a gaming facility.

As shown in FIG. 2, the gaming machines 4 such as the slot machines 4S, baccarat game tables 4B, roulette game machines 4R, and poker game machines 4P are provided at a gaming facility 15. In addition to that, the slot machines 4S managed by the slot machine management server 1 are associated with any of areas A to H in the gaming facility 15.

For example, the area A is provided with slot machines 4S which are of a type Y, in which the minimum bet (the minimum bet amount to start a game) is set to be lower than the minimum bet in the area B. The area B is provided with the slot machines 4S which are of the type Y, in which the minimum bet is set to be higher than the minimum bet in the area A. The area C is provided with slot machines 4S which are of a type Z, in which the minimum bet is set to be lower than the minimum bet in the area D. The area D is provided with the slot machines 4S which are of the type Z, in which the minimum bet is set to be higher than the minimum bet in the area C. The area E is provided with slot machines 4S, in which the minimum bet is set to be the highest among the minimum bets among the gaming facility 15. The area F is provided with slot machines 4S which are used exclusively for VIP members. The area G is provided with slot machines 4S which are of a type X, in which the minimum bet is set to be higher than the minimum bet in the area H. The area H is provided with the slot machines 4S which are of the type X, in which the minimum bet is set to be lower than the minimum bet in the area G.

In this regard, it is possible to arrange areas of each gaming facility at will, e.g., which slot machine 4S is associated with each area and for what reason each area is provided. For example, areas may correspond to respective types of games or manufacturers, areas may be classified based on values of minimum bets or based on available currencies, or one area may be associated with one slot machine 4S.

(Structure of Slot Machine Management Server 1)

Figure 4:
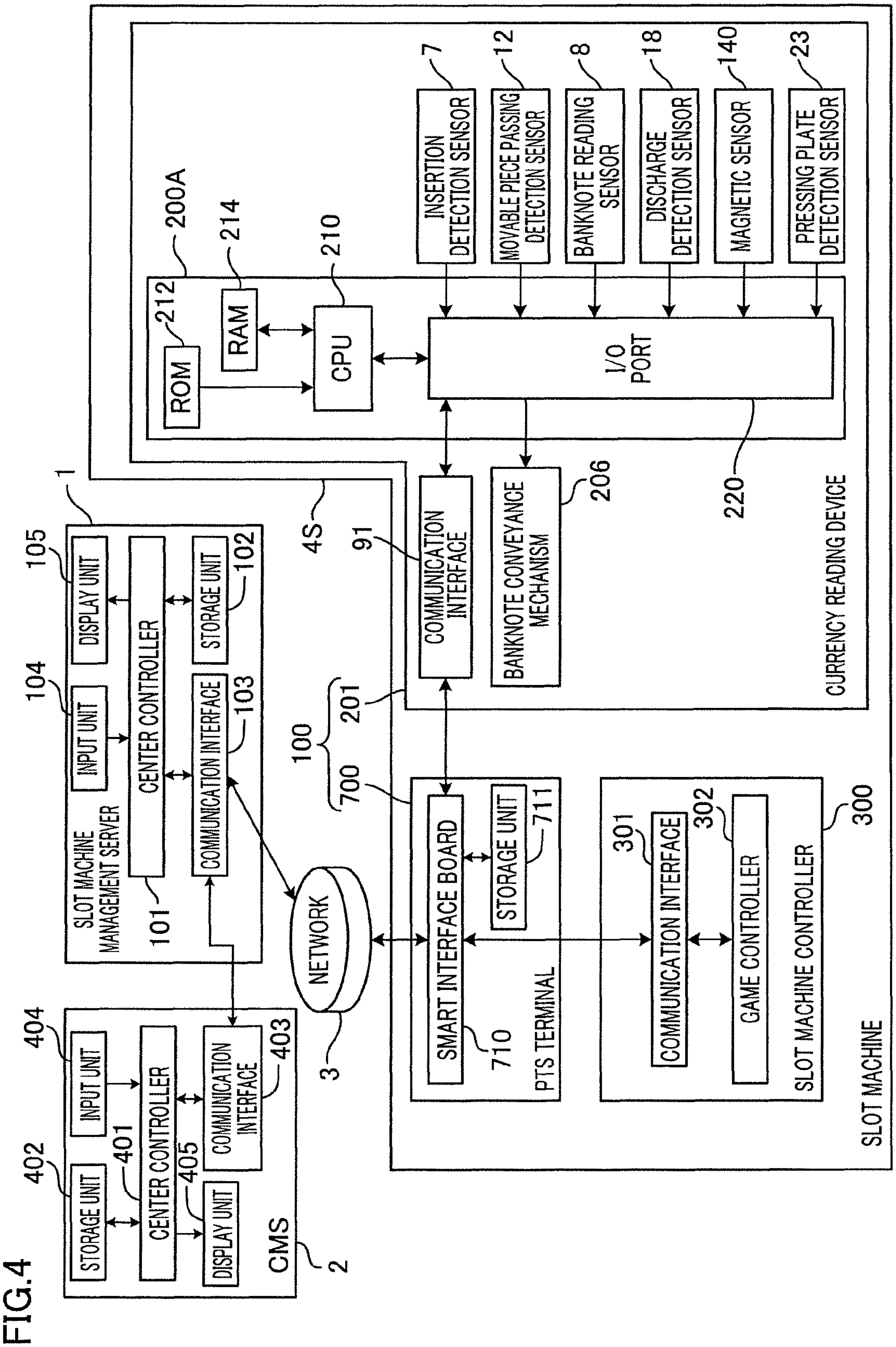
FIG. 4 is a block diagram of a casino management system, a slot machine management server, and a slot machine, etc.

As shown in FIG. 4, the slot machine management server 1 is a computer. The slot machine management server 1 includes a center controller 101, a storage unit 102 which stores information, etc., a communication interface 103 for achieving sending and receiving of a signal (command) to and from the outside, an input unit 104 (touch panel, keyboard, and mouse, etc.) which makes it possible to input information, etc., and a display unit 105 which is able to display characters and images, etc. In this regard, information is sent from the slot machine 4S (PTS terminal 700, etc.) or the casino management system 2, or is input from the input unit. Although not illustrated, the center controller 101 includes a CPU, a ROM, a RAM, and an I/O port to which members such as the storage unit 102, the communication interface 103 (transmitter), the input unit 104, and the display unit 105 are connected.

(Structure of Casino Management System 2)

As shown in FIG. 4, the casino management system 2 is a computer which manages the operation of the entire casino (including management of the exchange rate, etc.). Similarly to the slot machine management server 1, the casino management system 2 includes a center controller 401, a storage unit 402 which stores information, etc., a communication interface 403 for achieving sending and receiving of a signal (command) to and from the outside, an input unit 404 (touch panel, keyboard, and mouse, etc.) which makes it possible to input information, etc., and a display unit 405 which is able to display characters and images, etc. In this regard, information is sent from the slot machine management server 1 or is input from the input unit.

The center controller 401 of the casino management system 2 plays a role of sending information of the exchange rate which is stored in the storage unit 402 to the currency handling system 100 (PTS terminal 700) in a case in which a banknote T read by the currency reading device 201 is determined as a foreign currency in the PTS terminal 700. In this casino management system 2, the exchange rate referred by the entire casino system is managed. This exchange rate is updated by manual input of a person in charge of the casino management system 2 at a predetermined time (AM 6:00).

(Slot Machine 4S)

In the present embodiment, the slot machine 4S will be described as an example of a gaming machine 4 which is provided with the currency handling system 100 (PTS terminal 700 and currency reading device 201). A device corresponding to the currency handling system 100 is also mounted at each of, e.g., the baccarat game table 4B, the roulette game machine 4R, and the poker game machine 4P which are managed by the table game management server 1A.

Figure 3:
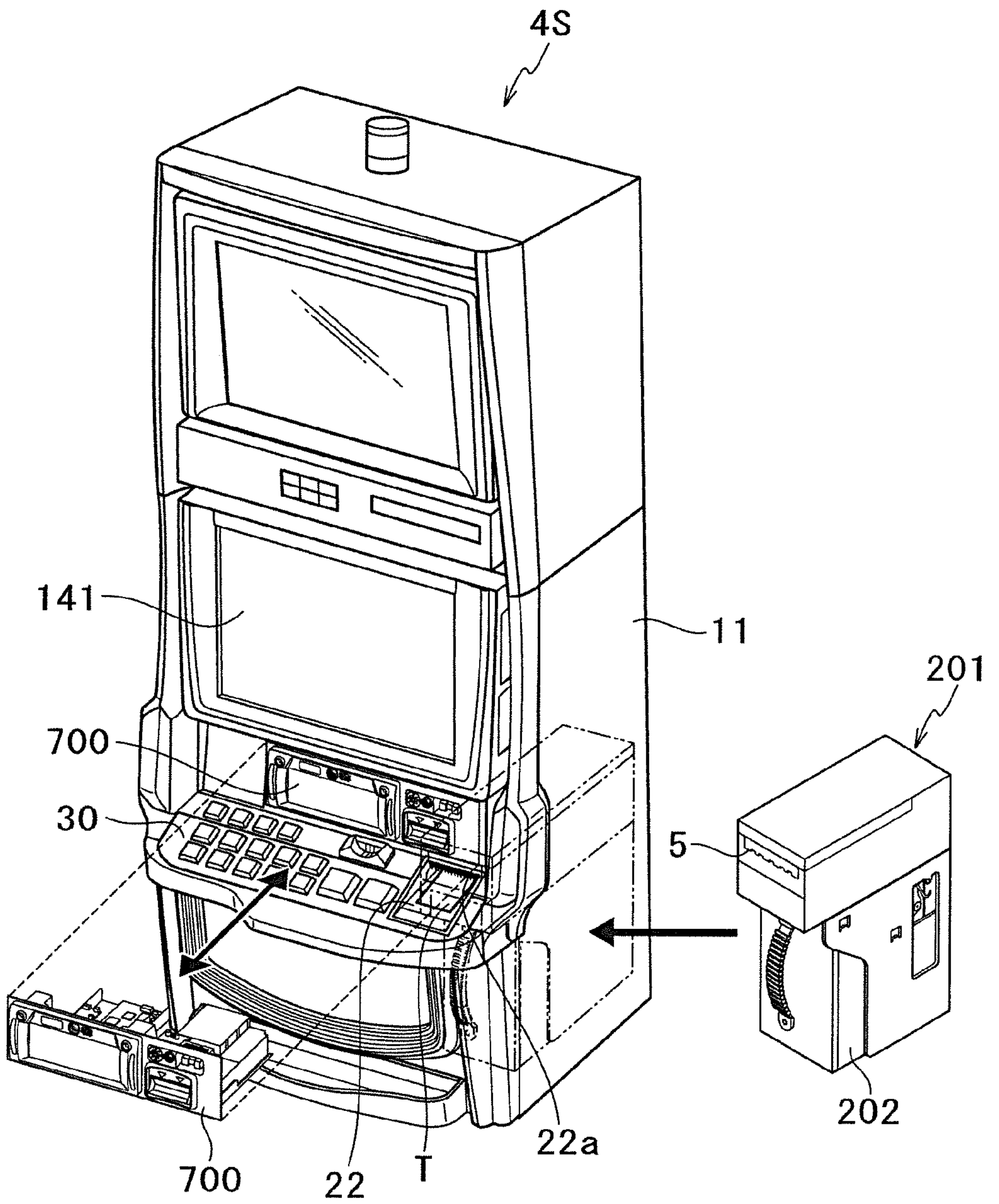
FIG. 3 illustrates a currency reading device and a PTS terminal which are provided at a slot machine.

As shown in FIG. 3, the slot machine 4S includes a cabinet 11. In the cabinet 11, the currency reading device 201, a slot machine controller 300, and the PTS terminal 700 are provided. Outside the cabinet 11, the followings are provided: a game image display panel 141 which displays a game image, etc.; a control panel 30 which is provided with buttons, etc., for operating a game; and a bill entry 22 which includes an insertion slot 22*a* for receiving a banknote T from the outside. In other words, a banknote T is received into the currency reading device 201 through the insertion slot 22*a* of the bill entry 22.

(Currency Reading Device 201)

As shown in FIG. 3, the currency reading device 201 is disposed in the cabinet 11 so that a banknote insertion slot 5 is identical to the insertion slot 22*a* of the bill entry 22. In this way, a banknote T inserted from the insertion slot 22*a* of the bill entry 22 is introduced into the currency reading device 201. In addition to that, the currency reading device 201 includes a banknote accommodation unit 202 which accommodates the received banknote T. The banknote accommodation unit 202 has a function as a safe, and is detachable from the currency reading device 201.

In the currency reading device 201 of the present embodiment, not only a banknote T of PHP (peso) but also banknotes T of plural foreign currencies (USD, US dollar; JPY, Japanese yen; CNY, yuan; HKD, Hong Kong dollar; EUR, euro; MOP, Macanese pataca; AUD, Australian dollar) are available. PHP (peso) is set as a local currency.

As shown in FIG. 4, a banknote conveyance mechanism 206 is provided inside the currency reading device 201. The banknote conveyance mechanism 206 conveys a banknote T which is inserted from the insertion slot 22*a* of the bill entry 22, to the banknote accommodation unit 202. In addition to that, inside the currency reading device 201, a control circuit board 200A which controls motion of a driving device such as the banknote conveyance mechanism 206 is provided. On this control circuit board 200A, a CPU (Control Processing Unit) 210, a ROM (Read Only Memory) 212, a RAM (Random Access Memory) 214, and an I/O port 220 are mounted.

The CPU 210 receives detection signals, through the I/O port 220, from sensors such as an insertion detection sensor 7, a movable piece passing detection sensor 12, a banknote reading sensor 8, a discharge detection sensor 18, a magnetic sensor 140, and a pressing plate detection sensor 23. The insertion detection sensor 7 detects a banknote T inserted into the banknote insertion slot 5. The movable piece passing detection sensor 12 detects being passed through a predetermined position of the banknote conveyance mechanism 206. The banknote reading sensor 8 reads information of the banknote T which is being conveyed. The discharge detection sensor 18 detects the banknote T being discharged into the banknote accommodation unit 202. The magnetic sensor 140 detects whether banknotes T which are laminated and accustomed in the banknote accommodation unit 202 reach a predetermined number. The pressing plate detection sensor 23 can detect a position of a pressing plate which presses banknotes T in the banknote accommodation unit 202. Based on these detection signals, the drive control of the banknote conveyance mechanism 206, etc., is performed. To the I/O port 220, a communication interface 91 is connected. The communication interface 91 is connected to a smart interface board 710 of the PTS terminal 700 so as to enable data communication with the PTS terminal 700.

The insertion detection sensor 7 generates a detection signal when detecting a banknote T inserted into the banknote insertion slot 5. While the insertion detection sensor 7 is an optical sensor such as a retro-reflective photo sensor, the insertion detection sensor 7 may be constituted by a mechanical sensor.

The movable piece passing detection sensor 12 generates a detection signal when detecting that a distal end of the banknote T has passed through the predetermined position of the banknote conveyance mechanism 206, and is provided upstream of the banknote reading sensor 8. This movable piece passing detection sensor 12 is also constituted by an optical sensor or a mechanical sensor, in the same manner as the insertion detection sensor 7.

The banknote reading sensor 8 reads banknote information of the banknote T conveyed by the banknote conveyance mechanism 206. In this regard, the banknote information which is read by the banknote reading sensor 8 is compared to reference data stored in the ROM 212, and the followings are determined: which country or region a currency belongs to; the money type (amount of the banknote T); and whether the banknote T is valid.

The discharge detection sensor 18 detects that a rear end of the banknote T has passed through and that the banknote T has been discharged into the banknote accommodation unit 202, and is provided immediately upstream of the banknote accommodation unit 202. This discharge detection sensor 18 is also constituted by an optical sensor or a mechanical sensor in the same manner as the insertion detection sensor 7.

In the ROM 212, the following sets of data are stored: programs such as an actuation program of the banknote conveyance mechanism 206 and a verification program regarding the banknote T which is read by the banknote reading sensor 8; and permanent data. The CPU 210 generates a control signal based on the programs stored in the ROM 212, sends and receives signals to and from the banknote conveyance mechanism 206 and the like through the I/O port 220, and performs the drive control of the banknote conveyance mechanism 206 and the like. The ROM 212 further stores, regarding the inserted banknote T, reference data used for determining which country or region a currency belongs to, the money type (amount of the banknote T), and the validity of the banknote T. For example, sets of data obtained from the entire print region of a valid banknote T (e.g., data regarding light and shade and data regarding transmitted light and reflected light when infrared light is applied to a valid banknote T) are stored. The RAM 214 stores data and a program used in operation of the CPU 210.

(Slot Machine Controller 300)

The slot machine controller 300 includes a game controller 302 which controls a process performed by the slot machine 4S, and the communication interface 301 which enables data communication with the PTS terminal 700 (see FIG. 4). Although not illustrated, the game controller 302 includes a CPU, a ROM, a RAM, and an I/O port to which members such as the control panel 30 and the game image display panel 141 are connected. The slot machine controller 300 sends, through the communication interface 301, a game result and game information such as the content of a bet betted on a game to the slot machine management server 1 through the PTS terminal 700, as a game information signal. In this regard, game information based on the game information signal received by the slot machine management server 1 is managed in the slot machine management server 1.

To be more specific, the game controller 302 runs a slot game which awards a payout based on a betted gaming value and a game result. In this slot game, twenty symbols determined randomly are displayed on a symbol display area which is formed of twenty areas forming a matrix with, e.g., five columns and four rows. In addition to that, a payout is awarded based on a displayed symbol combination (game result) and a betted gaming value.

(PTS Terminal 700)

As shown in FIG. 3, the PTS terminal 700 is inserted into the cabinet 11 from the front surface side of the slot machine 4S, and embedded in the slot machine 4S so as to form a part of the front surface of the cabinet 11. The PTS terminal 700 includes an LCD, a touch panel, a human detection camera, a microphone, a speaker, a card insertion slot, the smart interface board 710, and a storage unit 711.

The LCD displays an effect image used for an effect in a game, information when there is a payout as a game result, and a current exchange rate of each foreign currency. The touch panel is provided on the LCD to cause the PTS terminal 700 to function as an input device capable of receiving input from the outside. The human detection camera detects the presence of a player by a camera function. The microphone is used for allowing a player to participate in a game through input of player's voice and for authenticating a player by voice recognition. The speaker performs effects in a game by sound, and outputs various types of notification sound. The card insertion slot has a mechanism which allows an IC card such as a member card of a player of a game to be inserted and removed. The smart interface board 710 connected to the above-described components is a control board configured to control the components, and controls sending and receiving of signals to and from the outside. The storage unit 711 (ROM and RAM) is connected to the smart interface board 710, and makes it possible to store various information such as an exchange rate of each foreign currency.

The PTS terminal 700 is arranged to perform mediation in data communications between devices in the slot machine management server 1, the currency reading device 201, and the slot machine controller 300. Specifically, the currency reading device 201 sends the banknote information of a banknote T, which is received from the bill entry 22, to the PTS terminal 700. The PTS terminal 700 associates the received banknote information with area information showing where the slot machine 4S belongs to, and sends the information to the slot machine management server 1 and the casino management system 2 via the slot machine management server 1. As described above, the PTS terminal 700 performs mediation of data communication from the currency reading device 201 to the slot machine management server 1 and data communication from the currency reading device 201 to the slot machine controller 300.

The PTS terminal 700 calculates and exchanges (replaces) a foreign currency received by the currency reading device 201 into a local currency (PHP, peso) based on information of an exchange rate which is obtained from the casino management system 2. The LCD of the PTS terminal 700 makes it possible to display a current exchange rate of a currency of each country. In this regard, the LCD displays the timing of update (changing) of the exchange rate (for example, the LCD displays update time (AM 6:00) of the exchange rate).

(Process Related to Settings for Using Currencies)

The following will describe a process in which usage of a $100 bill of the USA banknote is limited in some slot machines 4S provided in the gaming facility 15 when an administrator of the slot machine management server 1 obtains information of the circulation of counterfeit US $100 bills from outside, with reference to FIG. 5 to FIG. 14.

To begin with, when a person in charge of the casino management system 2 obtains information regarding the circulation of the counterfeit US $100 bills (hereinafter, counterfeit bill information) from an international organization, an administrative organization (police), and a management department, etc., the person in charge of the casino management system 2 notifies the administrator of the slot machine management server 1 of the circulation of the counterfeit bill information from the casino management system 2.

Figure 10:
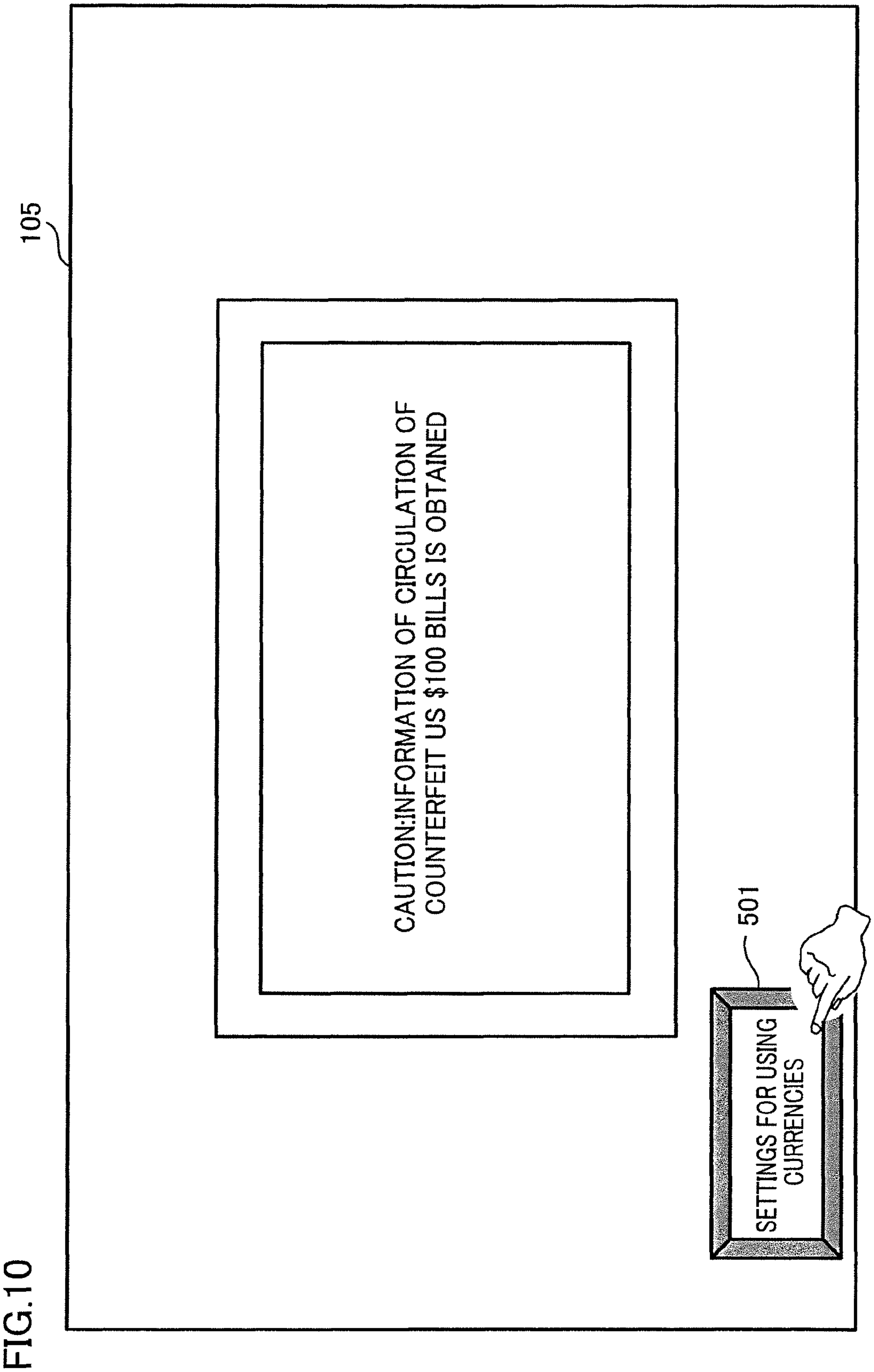
FIG. 10 is an explanatory diagram showing a state in which counterfeit bill information is displayed on a display unit of the slot machine management server.
Figure 11:
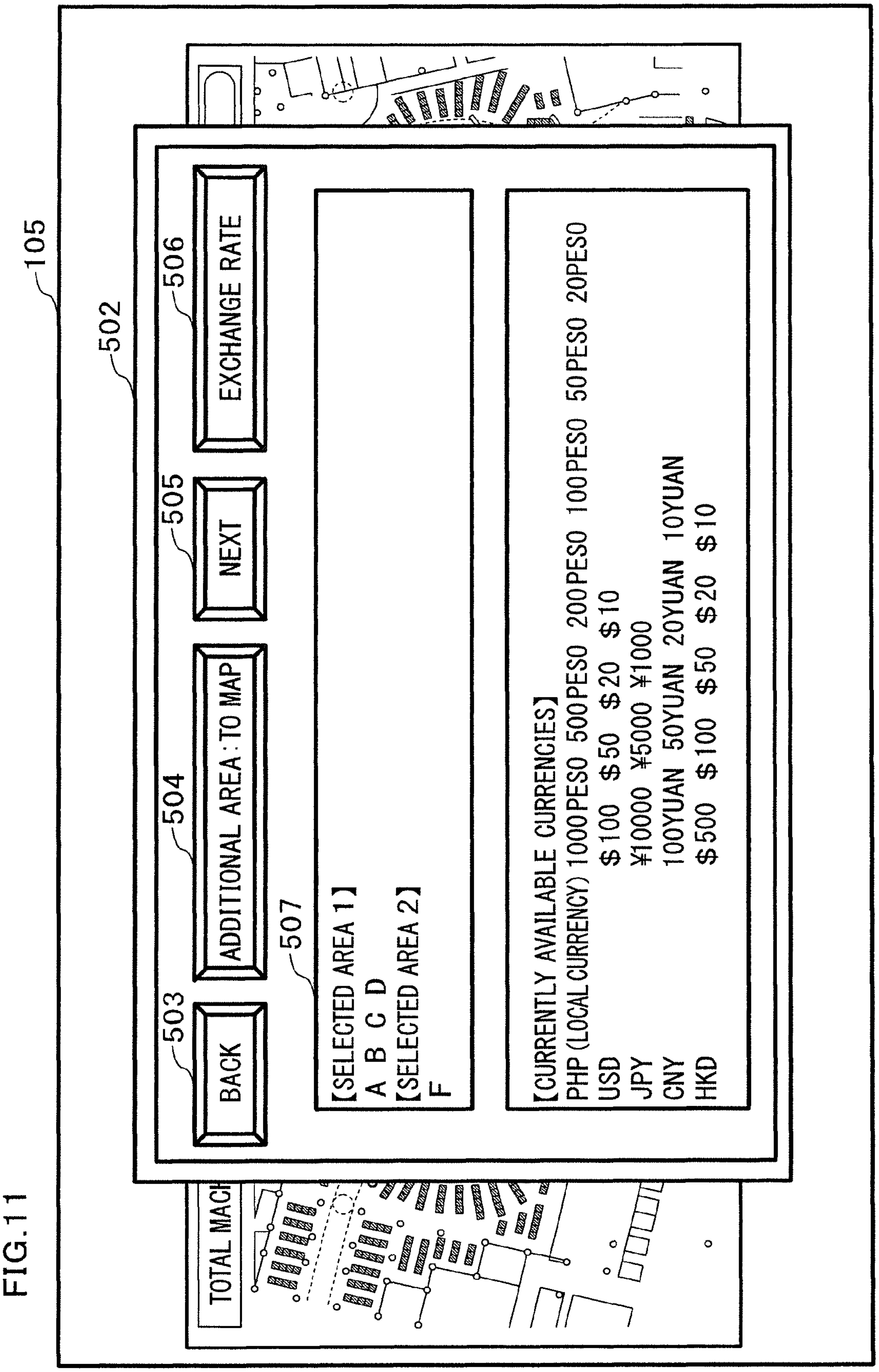
FIG. 11 is an explanatory diagram of a status window showing currencies which are currently available.

For example, when the administrator of the slot machine management server 1 grasps the counterfeit bill information from the person in charge of the casino management system 2 by a mail displayed on the display unit 105 as shown in FIG. 10, the administrator of the slot machine management server 1 performs settings for using currencies by using currency management software and the input unit 104 of the slot machine management server 1. To be more specific, the administrator selects a currency use setting icon 501 (see FIG. 10) displayed on the display unit 105. Subsequently, as shown in FIG. 11, a status window 502 showing currently available currencies is displayed.

In this step, for example, when the administrator needs to limit the usage of the $100 bill of the USA banknote only in areas A to D among the areas A to H of the gaming facility 15, the administrator firstly selects a "selected area 1" on a selecting area screen 507 (see FIG. 11) displayed on the status window 502, and then selects an additional area icon 504. Subsequently, as shown in FIG. 2, a map of the areas A to H associated with slot machines 4S provided at the gaming facility 15 is displayed on the display unit 105. Then, the administrator selects the areas A to D from among the areas A to H of the map of the gaming facility 15 which is displayed on the display unit 105. After the areas A to D are selected, a Next button 505 is selected. As a result, the status window 502 of FIG. 11 is displayed again. Because of this, characters of the areas A to D are displayed at an item of the "selected area 1" of the selecting area screen 507 displayed on the status window 502. The characters of the areas A to D show areas which are targets of the settings for using currencies.

For example, when there are plural areas which are different in the degree of security (e.g., a (VIP-only) area F in which identification is performed and other areas in which identification is not performed), even when the information of the circulation of counterfeit US $100 bills is obtained, it may not be preferred to limit the usage of currencies which imposes a burden on players in the area F in which security is set high (because the players have already been identified, risks such as usage of the counterfeit bills may be low). In this regard, by selecting only areas where the usage of the US $100 bills is to be stopped (limited) and by not selecting an area where the usage of the US $100 bills is not to be stopped (limited) from among the areas A to H of the map of the gaming facility 15 which is displayed on the display unit 105, it is possible to send a command causing only currency reading devices 201 of slot machines 4S provided at the selected areas to stop (limit) the usage of the US $100 bills. Because of this, it is possible not to limit the usage of the $100 bill of the USA banknote at an area in which the usage of the $100 bill of the USA banknote is not required to be stopped (limited).

Figure 12:
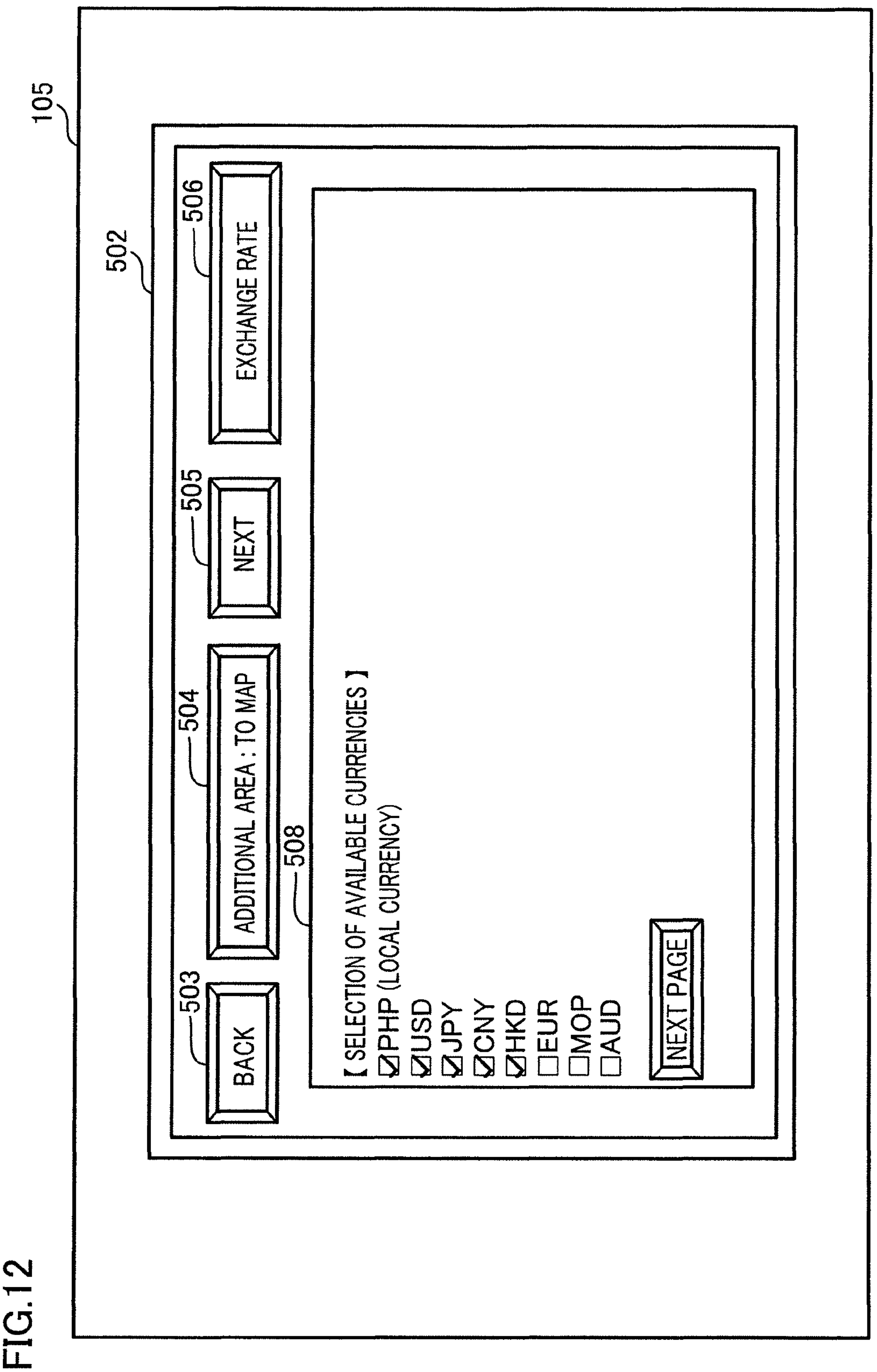
FIG. 12 is an explanatory diagram of an available currency selection screen.

Next, the administrator selects the Next button 505 to cause the shift to an available currency selection screen 508 of FIG. 12. In this screen, the administrator selects currencies which are available at the areas A to D. As shown in FIG. 12, when PHP (peso), USD (US dollar), JPY (Japanese yen), CNY (yuan), and HKD (Hong Kong dollar) are selected, PHP (peso), USD (US dollar), JPY (Japanese yen), CNY (yuan), and HKD (Hong Kong dollar) become available in slot machines 4S provided at the areas A to D. Meanwhile, regarding EUR (euro), MOP (Macanese pataca), and AUD (Australian dollar) which are not selected, it is possible to set these currencies to be unavailable in the slot machines 4S provided at the areas A to D. In the present embodiment, PHP (peso) is set as a local currency, and other currencies are treated as foreign currencies.

Figure 13:
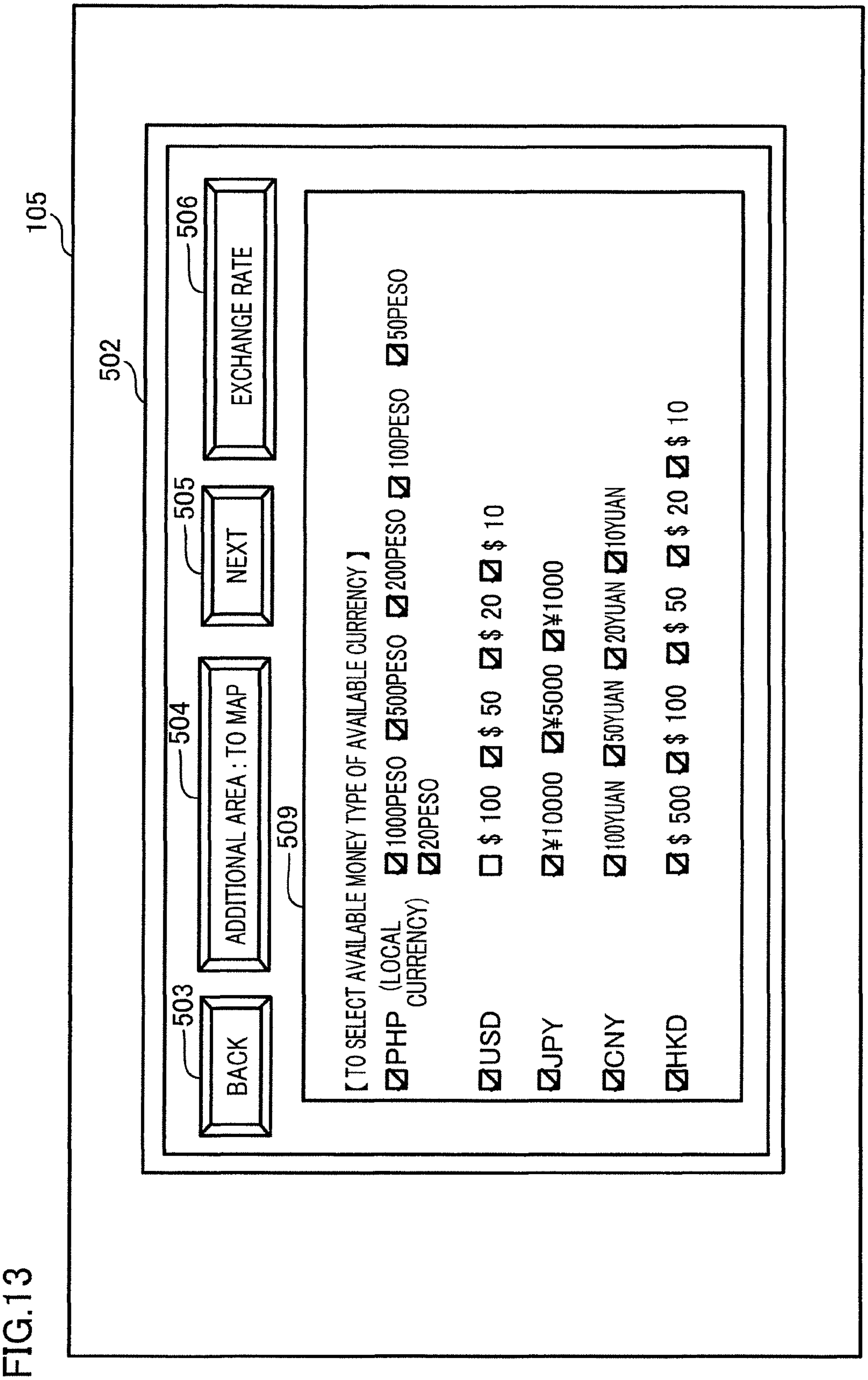
FIG. 13 is an explanatory diagram of an available money type selection screen.
Figure 14:
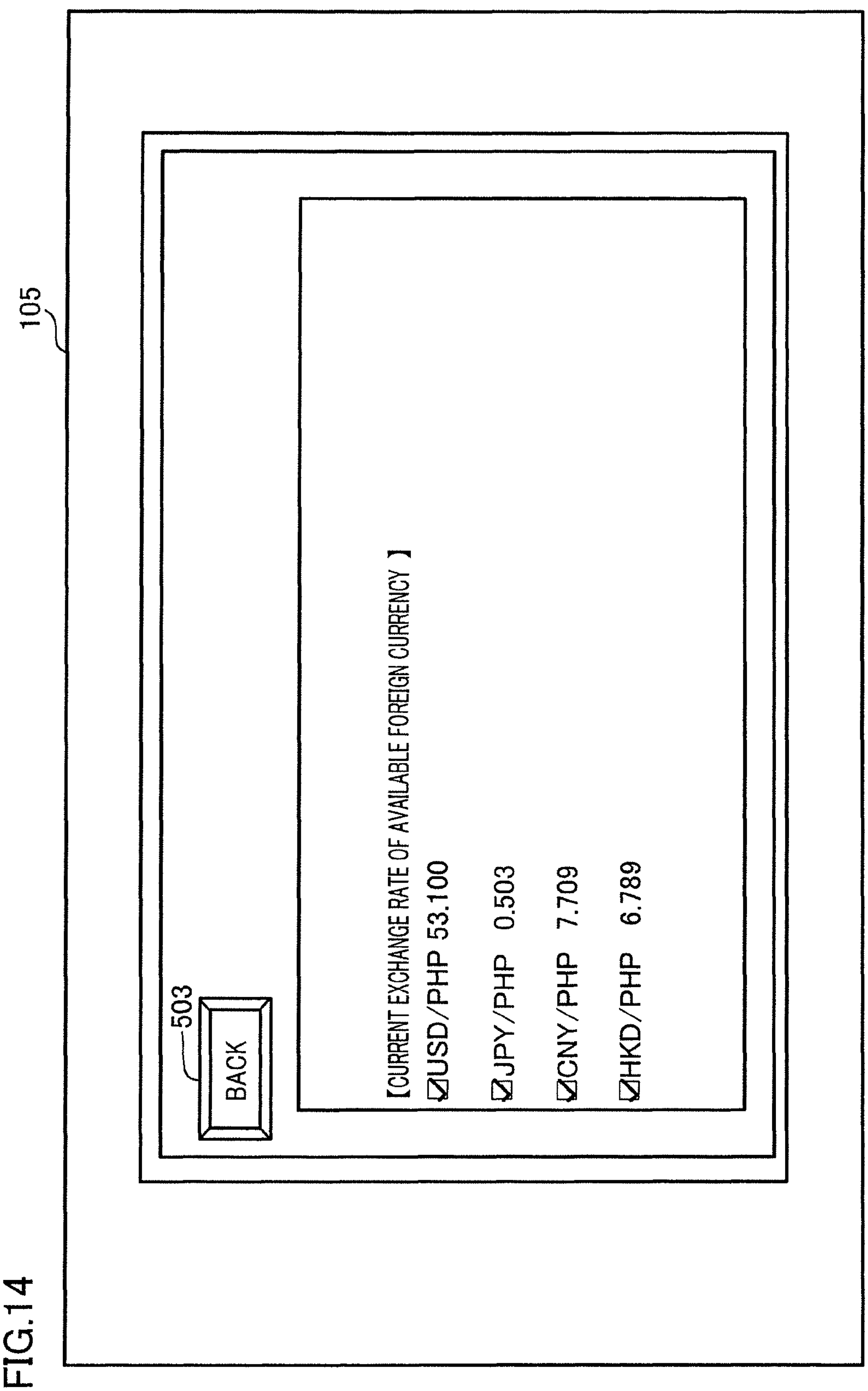
FIG. 14 is an explanatory diagram of an exchange rate screen.

Subsequently, the administrator selects the Next button 505 to cause the shift to an available money type selection screen 509 of FIG. 13. In this screen, the administrator selects available money types (banknotes T) of the currencies which have been selected to be available on the available currency selection screen 508. As shown in FIG. 13, in USD (US dollar) which is set to be available, when a $50 banknote, a $20 banknote, and a $10 banknote are selected, the $50 banknote, the $20 banknote, and the $10 banknote are available in the slot machines 4S provided at the areas A to D. Meanwhile, regarding the $100 banknote which is not selected by the administrator who grasps the counterfeit bill information, it is possible to set the banknote to be unavailable in the slot machines 4S provided at the areas A to D. Then, when the administrator selects the Next button 505, a confirmation screen (not illustrated) is displayed. After the confirmation is accepted, the settings for using currencies are completed. In this regard, contents (such as information of areas in which the settings for using currencies are performed, information of currencies which are set to be available or unavailable, and information of money types which are set to be available or unavailable) of the settings for using currencies are stored in the storage unit 102.

On the status window 502 (see FIG. 11), the available currency selection screen 508 (see FIG. 12), and the available money type selection screen 509 (see FIG. 13), etc., an exchange rate button 506 is displayed to cause the shift to an exchange rate screen 510 (see FIG. 14) showing the exchange rate of each currency which is inputted in the casino management system 2. On the status window 502, the available currency selection screen 508, and the available money type selection screen 509, etc., a Back button 503 which enables to go back to a prior page is also displayed.

(Available Currency Management Process)

Figure 5:
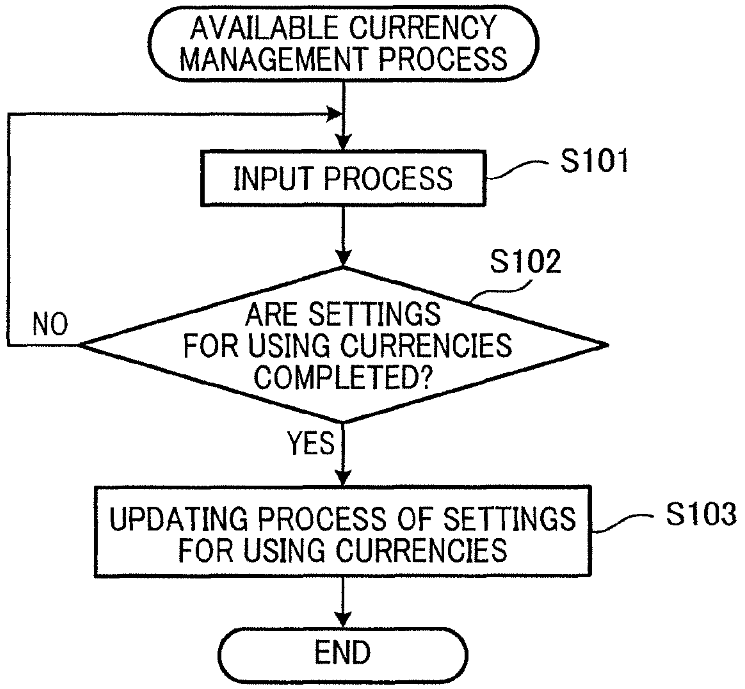
FIG. 5 is a flowchart of an available currency management process.

The following will describe an available currency management process performed at the slot machine management server 1, with reference to a flowchart of FIG. 5.

To begin with, the above-described settings for using currencies are performed by the input unit 104 (S101: input process). Subsequently, the center controller 101 determines whether the settings for using currencies are completed in the input process (S102). If the settings for using currencies have not been completed (NO in S102), completion of the settings for using currencies is waited.

Meanwhile, if the settings for using currencies have been completed (YES in S102), the settings for using currencies which are stored in the storage unit 102 are updated (S103). For example, as described above, when the areas A to D are selected from among the areas A to H of the map of the gaming facility 15 displayed at the display unit 105 of FIG. 2, the settings for using currencies (information of currencies which are set to be available or unavailable and information of money types which are set to be available or unavailable are updated) are updated in regard to the slot machines 4S provided at the areas A to D. Then, this process is terminated.

In this regard, when the settings for using currencies are updated in the step S103, information of the settings for using currencies is sent to PTS terminals 700 at the area where the settings have been done, and kinds of available and unavailable currencies and money types are updated to be displayable on LCDs of the PTS terminals 700 or on display devices of the slot machines 4S. Alternatively, on LCDs of the PTS terminals 700 or on the display devices of the slot machines 4S, only kinds of available currencies and money types may be displayed and kinds of unavailable currencies and money types may not be displayed.

(Banknote Receiving Process)

Figure 6:
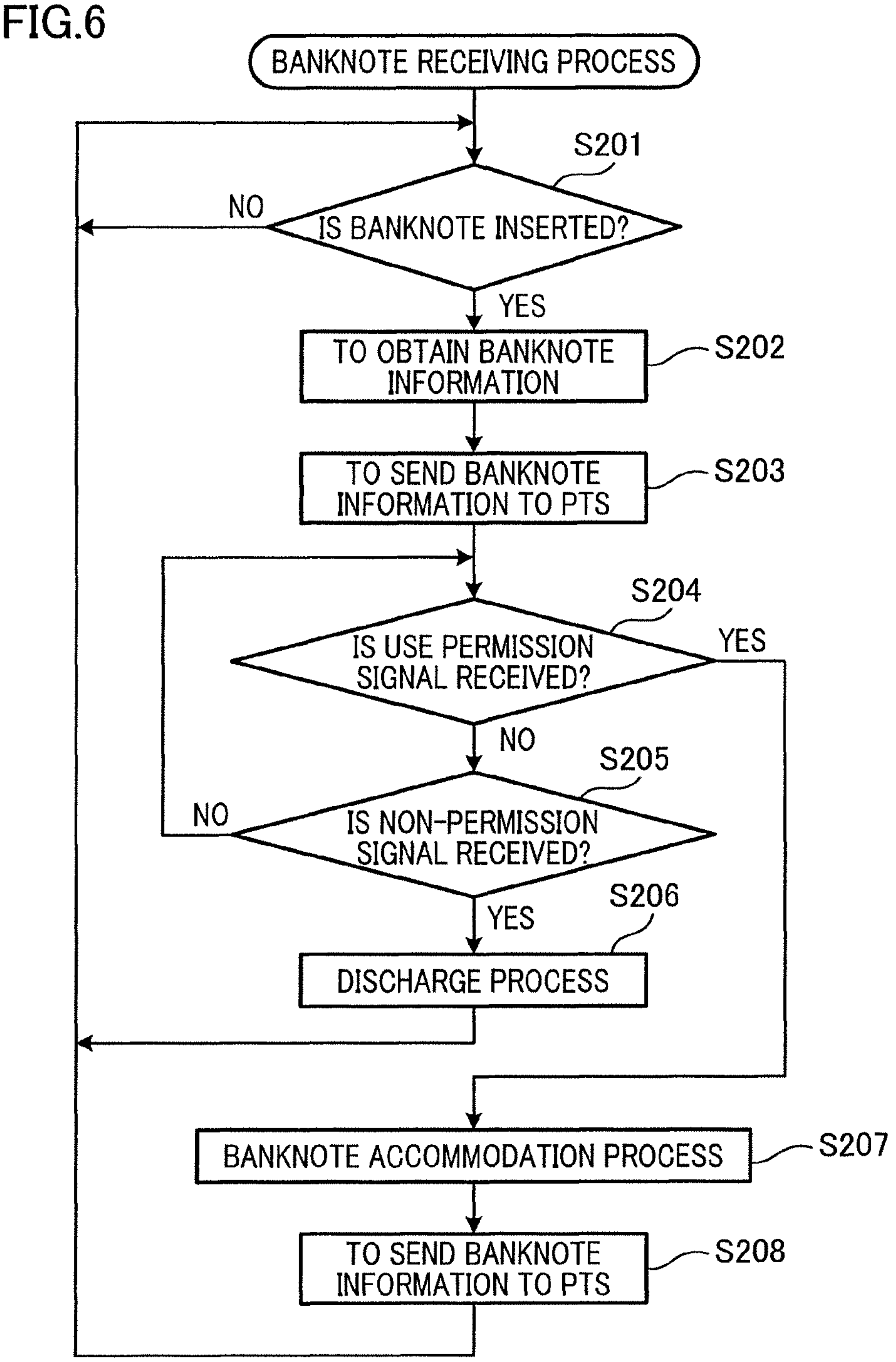
FIG. 6 is a flowchart of a banknote receiving process.

A banknote receiving process will be described with reference to a flowchart of FIG. 6. The banknote receiving process is performed by a CPU 210 of a control circuit board 200A when a currency reading device 201 mounted at a slot machine 4S receives a banknote T from a bill entry 22 after the settings for using currencies are updated in the available currency management process described above, in the slot machine management server 1. In this description, a currency handling system 100 (currency reading device 201 and PTS terminal 700) is used as an example. The currency handling system 100 is mounted at the slot machine 4S provided at one of the areas A to D selected in the settings for using currencies in the available currency management process described above.

To begin with, the CPU 210 determines whether a valid banknote T is inserted from the bill entry 22 (S201). If a valid banknote T has not been inserted (NO in S201), the CPU 210 performs the step S201 again and waits for the insertion of a valid banknote T.

Meanwhile, if a valid banknote T has been inserted (YES in S201), the CPU 210 obtains banknote information of the inserted banknote T based on a signal from the banknote reading sensor 8 (S202). To be more specific, the followings are obtained as the banknote information: a kind of the inserted banknote T (currency such as PHP, peso; USD, US dollar; JPY, Japanese Yen; CNY, yuan; HKD, Hong Kong dollar; EUR, euro; MOP, Macanese pataca; AUD, Australian dollar); and a money type of the inserted banknote T (e.g., monetary amount such as $100 banknote, $50 banknote, $20 banknote, and $10 banknote, etc., in USD; US dollar).

Subsequently, the CPU 210 sends the banknote information which has been obtained in the step S202 to the PTS terminal 700. The PTS terminal 700 which has received the banknote information sends a banknote information signal to the slot machine management server 1 (S203). The banknote information signal is a signal in which the received banknote information is associated with area information showing to which area the slot machine 4S belongs. In this regard, the banknote information signal is a signal which is sent from the PTS terminal 700 to the casino management system 2, the slot machine management server 1, and the slot machine controller 300, etc. This banknote information signal is formed in such a way that the above-described banknote information, read from the banknote T by the banknote reading sensor 8, is associated with area information. The area information shows to which area the slot machine 4S, including the currency reading device 201 which has read the banknote T, belongs.

In this regard, when the slot machine management server 1 receives a banknote information signal (details thereof will be described later), whether the currency of the banknote indicated by the signal is an available currency is determined based on the received banknote information signal and the settings, stored in the slot machine management server 1, for using currencies (information of areas in which the settings for using currencies are performed, information of currencies which are set to be available or unavailable, and information of money types which are set to be available or unavailable). If it is an available currency, a use permission signal is sent to the currency reading device 201 through the PTS terminal 700 of the slot machine 4S which has sent the banknote information signal. Meanwhile, if it is an unavailable currency, a non-permission signal is sent to the currency reading device 201 through the PTS terminal 700 of the slot machine 4S which has sent the banknote information signal.

Subsequently, the CPU 210 determines whether a use permission signal sent through the PTS terminal 700 from the slot machine management server 1 is received (S204). If a use permission signal has not been received (NO in S204), the CPU 210 determines whether a non-permission signal sent through the PTS terminal 700 from the slot machine management server 1 is received (S205). In addition to that, if a non-permission signal has not been received (NO in S205), the step S204 is performed again.

Meanwhile, if a non-permission signal has been received (YES in S205), the inserted banknote T is discharged from the bill entry 22 (S206: discharge process). For example, when EUR (euro) is not selected on the available currency selection screen 508 of FIG. 12 and is set as an unavailable currency, every inserted euro banknote is determined as a banknote of the unavailable currency and discharged from the bill entry 22. When a $100 banknote of USD is not selected on the available money type selection screen 509 of FIG. 13 and is set as an unavailable money type of a currency, the inserted $100 banknote is determined as the unavailable money type of the currency and discharged from the bill entry 22. Because of this, even if the $100 banknote is inserted from the bill entry 22, the usage of the $100 banknote which is set as the unavailable money type of the currency in the slot machine management server 1 is limited (stopped) in such a way that the $100 banknote is discharged. Then, after the discharge process of S206, the routine goes back to S201.

If the use permission signal has been received in the step S204 (YES in S204), the CPU 210 conveys the inserted banknote T to a banknote accommodation unit 202 and stores the inserted banknote T (S207). For example, on the available money type selection screen 509 of FIG. 13, when a $50 banknote, $20 banknote, and $10 banknote of USD are selected and set as available money types of an available currency, it is determined that every inserted $50 banknote, $20 banknote, and $10 banknote are determined as the available money types of the available currency. As a result, every inserted $50 banknote, $20 banknote, and $10 banknote are conveyed to the accommodation unit 202 and stored.

Subsequently, the CPU 210 sends the banknote information which has been obtained in the step S202 to the PTS terminal 700 (S208).

(Usage Checking Process)

Figure 7:
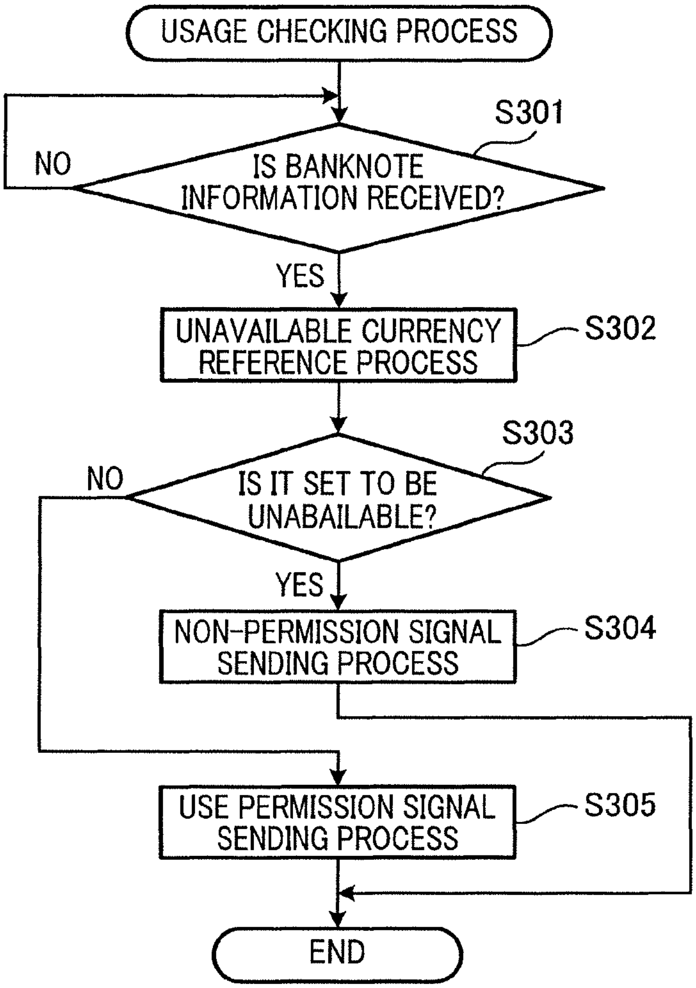
FIG. 7 is a flowchart of a usage checking process.

A usage checking process will be described with reference to a flowchart of FIG. 7. The usage checking process is performed by the center controller 101 of the slot machine management server 1 when the slot machine management server 1 receives the banknote information signal which has been sent from the PTS terminal 700 in the step 203 of the banknote receiving process described above.

To begin with, the center controller 101 determines whether the banknote information signal having been sent from the PTS terminal 700 in the step S203 of the banknote receiving process described above is received (S301). If the banknote information signal has not been received (NO in S301), supply of the signal is waited.

Meanwhile, if the banknote information signal has been received (YES in S301), the center controller 101 performs an unavailable currency reference process (S302). In this unavailable currency reference process, the banknote information and area information of the received banknote information signal are compared with the settings (information of areas in which the settings for using currencies are performed, information of currencies which are set to be available or unavailable, and information of money types which are set to be available or unavailable) for using currencies which are stored in the storage unit 102.

In the unavailable currency reference process, the center controller 101 determines whether the inserted banknote T is an unavailable banknote whose money type of a currency is set to be unavailable (S303). The inserted banknote T is inserted into the currency reading device 201 mounted at the slot machine 4S which has sent the banknote information signal. If it is determined that the inserted banknote T is an unavailable banknote whose money type of a currency is set to be unavailable (YES in S303), a non-permission signal is sent to the currency reading device 201 through the PTS terminal 700 of the slot machine 4S which has sent the banknote information signal (S304).

Meanwhile, if it is determined that the inserted banknote T is not an unavailable banknote whose money type of a currency is set to be unavailable (NO in S303), a use permission signal is sent to the currency reading device 201 through the PTS terminal 700 of the slot machine 4S which has sent the banknote information signal (S305). Then, this process is terminated.

In one example, the slot machine management server 1 receives, from the input unit 104, information which stops (limits) the usage of $100 banknotes (equivalent to the predetermined money type) of USD (equivalent to the predetermined currency) in the areas A to D of the map of the gaming facility 15, and then determines that the currency used in each currency reading device 201 of the slot machines 4S provided at the areas A to D is the $100 banknote of USD the usage of which is stopped (limited). In this case, by discharging the used banknote T ($100 banknote of USD), the slot machine management server 1 can send a command which stops (limits) the usage of the used banknote T to the currency reading device 201 through the PTS terminal 700. Because of this, when the information of the circulation of counterfeit US $100 bills is obtained, a limit such as stop of the usage of the US $100 bills is uniformly and rapidly performed at the gaming facility 15 having slot machines 4S provided with currency reading devices 201 in each of which a wide variety of currencies are available.

(Banknote Information Receiving Process)

Figure 8:
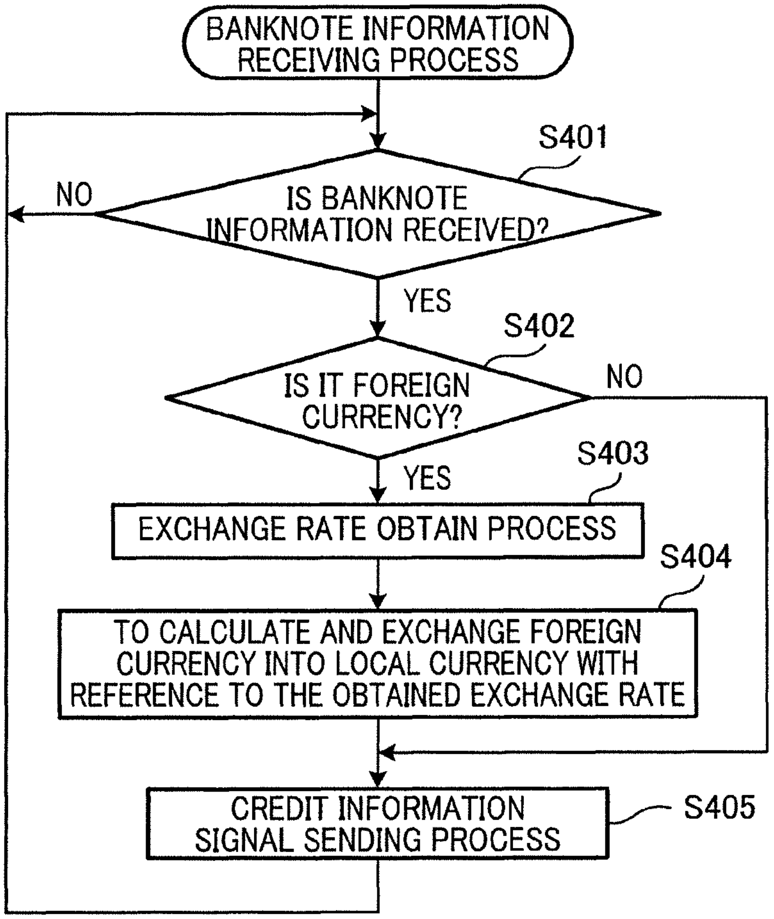
FIG. 8 is a flowchart of a banknote information receiving process.

A banknote information receiving process will be described with reference to a flowchart of FIG. 8. The banknote information receiving process is performed by the smart interface board 710 when the PTS terminal 700 receives the banknote information which has been sent in the step S208 of the banknote receiving process described above.

To begin with, the smart interface board 710 determines whether the banknote information which has been sent from the currency reading device 201 is received (S401). If the banknote information has not been received (NO in S401), supply of the banknote information is waited.

Meanwhile, if the banknote information has been received (YES in S401), the smart interface board 710 determines whether a kind of a banknote T which is read from the banknote information is a foreign currency, i.e., whether it is one of currencies except PHP (peso) of a local currency (S402). In the present embodiment, USD (US dollar), JPY (Japanese yen), CNY (yuan), and HKD (Hong Kong dollar), etc., are foreign currencies.

If information indicating the kind of the banknote T which is read from the banknote information has been determined as one of foreign currencies (YES in S402), the smart interface board 710 performs an exchange rate obtain process (S403). In this exchange rate obtain process, the casino management system 2 is accessed (asked) through the slot machine management server 1 from the PTS terminal 700, and an exchange rate is obtained. The exchange rate is stored in the storage unit 402 of the casino management system 2, and corresponds to the foreign currency which is the type read from the banknote information. For example, when the foreign currency which is the type read from the banknote information is US dollar, an exchange rate is obtained. The exchange rate ("USD/PHP") regulates an exchange ratio which is used for exchanging US dollar of a foreign currency into PHP (peso) of a local currency. In this regard, the obtained exchange rate is stored in the storage unit 711.

Subsequently, the smart interface board 710 calculates and exchanges (replaces) a money type (monetary amount) of the foreign currency into a monetary amount of a local currency (PHP, peso) with reference to the exchange rate which has been obtained in the step S403 (S404). In this regard, the foreign currency is the type read from the banknote information.

In this step, the exchange rate of a currency of each country which is stored in the storage unit 402 of the casino management system 2 is an exchange ratio from a foreign currency which is available in the gaming machine 4 (e.g., slot machine 4S which is managed by the slot machine management server 1, and baccarat game table 4B and roulette game table 4R which are managed by the table game management server 1A) provided at the gaming facility 15 to a local currency (PHP, peso), and is updated by manual input from the input unit 404 at every predetermined time. The manual input is made by the person in charge of the casino management system 2 who has obtained information of the exchange rate from the outside. In the present embodiment, at every predetermined time (e.g., AM 6:00), the person in charge of the casino management system 2 grasps the latest information of the exchange rate of each foreign currency and manually updates the exchange rate of a currency of each country which is stored in the storage unit 402. In this regard, the update of the exchange rate may be performed at a wide variety of timing in accordance with a kind of the currency. In the present embodiment, the update of the exchange rate in the casino management system 2 is manually performed. Alternatively, the exchange rate in the casino management system 2 may be automatically updated by automatically obtaining exchange rates from the outside. Alternatively, instead of the predetermined time, the exchange rate may be adjusted to an exchange rate which varies in real time. Information of the exchange rate is sent to a PTS terminal 700 of each slot machine 4S through the slot machine management server 1. Because of this, a PTS terminal 700 which has obtained the exchange rate is able to display a current exchange rate of a currency of each country on an LCD.

In the step S404, for example, when an exchange rate "USD/PHP" obtained from the casino management system 2 is "53. 100" (one US dollar is exchanged into 53. 100 pesos) and a money type (monetary amount) of a foreign currency is a $10 banknote of USD, it is calculated and exchanged into 531 pesos of a local currency. In this regard, the foreign currency is the type read from the banknote information.

Meanwhile, if it is determined that the kind of the banknote T which has been read from the banknote information in the step S402 is not one of foreign currencies (i.e., determined as PHP, peso, of local currency; NO in S402), or after the step S404, the smart interface board 710 performs a credit information signal sending process (S405). In this credit information signal sending process, when the kind of the banknote T which has been read from the banknote information in the step S402 is PHP (peso) of a local currency, a monetary amount of the money type is sent to the slot machine controller 300 as a credit information signal. For example, when the kind of the banknote T which has been read from the banknote information in the step S402 is 500 pesos of a local currency, the 500 pesos are sent to the slot machine controller 300 as a credit information signal. When a foreign currency has been calculated and exchanged into a local currency, i.e., into PHP (peso) in the step S404, the exchanged monetary amount of the local currency is sent to the slot machine controller 300 as a credit information signal. For example, when a $10 banknote of USD has been calculated and exchanged into 531 pesos of a local currency in the step S404, the 531 pesos are sent to the slot machine controller 300 as a credit information signal. After that, the step S401 is performed again.

(Slot Game Running Process)

Figure 9:
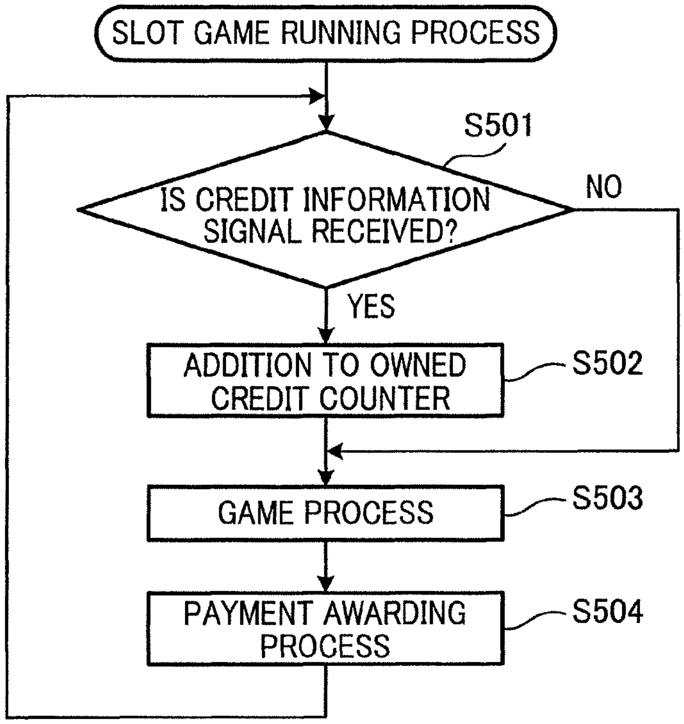
FIG. 9 is a flowchart of a slot game running process.

A flowchart of a slot game running process will be described with reference to FIG. 9. The slot game running process is performed by the game controller 302 of the slot machine controller 300 of the slot machine 4S.

To begin with, the game controller 302 determines whether a credit information signal is received from the PTS terminal 700 (S501). If a credit information signal has been received (YES in S501), the game controller 302 adds a monetary amount (PHP, peso, of local currency) based on the credit information signal to an owned credit counter of a RAM (S502). The owned credit counter of the RAM shows a monetary amount which is owned by a player.

After the step S502, or if a credit information signal has not been received (NO in S501), the game controller 302 performs a game process (S503). In this game process, a slot game is performed by a player. The slot game awards a payout based on a betted monetary amount (amount which is betted from the owned credit counter) and a game result. In this slot game, twenty symbols randomly determined are displayed on a symbol display area which is formed of twenty areas forming a matrix with, e.g., five columns and four rows. In addition to that, a payout is awarded based on a displayed symbol combination (game result) and a betted monetary amount. The awarded payout is added to the owned credit counter (S504). In this regard, for example, information based on a game result is sent to the slot machine management server 1 through the PTS terminal 700, and managed in the slot machine management server 1.

Other Embodiments

In the embodiment described above, the administrator of the slot machine management server 1 performs the settings for using currencies by manual input with the input unit 104 and the currency management software. However, the disclosure is not limited to this. When the counterfeit bill information is received from the outside such as the casino management system 2, the slot machine management server 1 may automatically perform the settings for using currencies based on the counterfeit bill information.

In the present embodiment described above, the currency handling system 100 is embedded in the gaming machine 4 such as the slot machine 4S. However, the disclosure is not limited to this. Alternatively, the currency handling system 100 may be a terminal device connected to an external apparatus such as a money exchanger, a vending machine, and a ticket machine. Alternatively, the currency handling system 100 may not be embedded in the terminal device. While in the present embodiment the currency handling system 100 is provided for each gaming machine 4, one currency handling system 100 may be provided for plural gaming machines 4.

In the embodiment described above, if the settings for using currencies have been completed (YES in S102), the settings for using currencies which are stored in the storage unit 102 are updated. In other words, the settings for using currencies are managed in the slot machine management server 1. However, the disclosure is not limited to this. The contents of the settings, set in the slot machine management server 1, for using currencies may be sent to the PTS terminal 700 and may be stored and managed in the storage unit 711. Because of this, in the storage unit 711 of the PTS terminal 700, the settings for using currencies (e.g., information of currencies which are set to be available or unavailable, information of money types which are set to be available or unavailable, and information of areas in which the settings for using currencies are performed) are updated. In this case, the usage checking process (see FIG. 7) is performed in the PTS terminal 700.

The exchange rates may be managed in the slot machine management server 1. Alternatively, a process of exchanging each foreign currency into a local currency may be performed in the casino management system 2 or the slot machine management server 1.

While in the present embodiment the slot machine management server 1 and the casino management system 2 play a role of the management server, one server may play a role of the management server.

In the embodiment described above, the usage of the $100 banknote is limited (stopped) in such a way that the $100 banknote is discharged even if the $100 banknote is inserted from the bill entry 22. In this regard, the $100 banknote is set as the unavailable money type of the currency. Meanwhile, the limit of usage of a currency which is set as an unavailable currency may be achieved by stopping an exchange function in which the PTS terminal 700 exchanges (replaces) a foreign currency into a local currency (PHP, peso). The foreign currency is the type read in the currency reading device 201. In this case, the slot machine management server 1 sends, to the PTS terminal 700, a command which stops (limits) exchange of the currency used at the currency reading device 201.

An embodiment of the present invention thus described above solely serves as a specific example of the present invention, and is not to limit the scope of the present invention. The specific structures and the like are suitably modifiable. Further, the effects described in the embodiment of the present invention described in the above embodiment are no more than examples of preferable effects brought about by the present invention, and the effects of the present invention are not limited to those described hereinabove.

REFERENCE SIGNS LIST

1 management server
2 casino management system
3 network
4 gaming machine
4S slot machine
100 currency handling system
101 center controller
102 storage unit
103 communication interface
104 input unit
105 display unit
201 currency reading device
300 slot machine controller
700 PTS terminal
T banknote

The invention claimed is:

1. A casino management system comprising:
a casino management server including:
a first controller;
a first non-transitory computer readable storage medium;
a first communications interface;
a first input unit; and,
a first display unit;
at least one of a slot machine management server or a table game management server, each including:
a second controller;
a second non-transitory computer readable storage medium;
a second communications interface;
a second input unit; and, a second display unit;
a plurality of slot machines or a plurality of table games, each including:
a third controller;
a third non-transitory computer readable storage medium;
a third communications interface;
a third input unit; and,
a currency handling system including a PTS terminal and a currency reading device;
wherein, the casino management server, the at least one slot machine management server or the table game server, and the plurality of slot machines or table games are in electronic communication with one another via a respective PTS terminal of each slot machine or table game;
wherein each PTS terminal includes:
a fourth display unit;
an input device;
a card insertion slot;
a smart interface board; and,
a fourth non-transitory computer readable storage medium;
wherein each currency reading device includes:
a fifth controller; a fifth non-transitory computer readable storage medium;
a fifth communications interface; a bank note conveyance mechanism including a plurality of electronic sensors; and,
a banknote accommodation unit,
wherein, the smart interface board of each respective PTS terminal facilitates electronic communication between a respective currency reading device of each slot machine or table game and the third controller of each slot machine or table game, and facilitates electronic communication between a respective slot machine or table game and the slot machine management server and the casino management server;

wherein, the slot machine management server or the table game management server is programmed to issue command instructions to a selected one or more of the plurality of slot machines or a selected one or more of the plurality of table games to only accept and authorize the use of one or more selected banknotes corresponding to one or more selected currencies;

wherein, when the PTS terminal of a respective selected one of the plurality of slot machines or a respective selected one or more of the table games receives the command instructions, the PTS terminal stores the command instructions and displays on a display device of the respective selected one or more slot machines or of the respective one of more gaming tables, or on the fourth display unit of the respective PTS terminal, information pertaining to one or more banknotes or currencies that are not accepted for use by the respective selected one of the plurality of slot machines or the respective selected one or more of the table games;

wherein, when a respective currency reading device of a respective selected slot machine or a respective selected gaming table receives an inserted banknote, the respective currency reading device obtains currency type and currency amount information from the inserted banknote and transmits the currency amount and type information to the respective PTS terminal in communication with the respective currency reading device;

wherein, when the amount and type information of the inserted banknote corresponds to a banknote that is accepted for use, the respective PTS terminal commands the respective currency reading device to accept the inserted banknote, and the respective currency reading device transfers the inserted banknote to the banknote accommodation unit of the respective currency handling device;

wherein, when the amount and type information of the inserted banknote does not correspond to a banknote that is accepted for use, the respective PTS terminal commands the respective currency reading device to discharge the inserted banknote;

wherein the slot machine management server or the table game management server is manually programmed to issue the command instructions to the selected one or more of the plurality of slot machines or the selected one or more of the plurality of table games using information input via a graphical user interface displayed on the second display unit;

wherein the graphical user interface includes a first field allowing the selection and input of one or more of banknotes of various currencies accepted and authorized for use; and wherein the graphical user interface includes a second field allowing the selection and input of one or more slot machines or table games in one or more designated areas of a casino that can accept and authorize the use of one or more of banknotes of various currencies.

2. The casino management system of claim 1, wherein the command instructions include exchange rate information pertaining to one or more of the selected currencies accepted and authorized for use.

3. The casino management system of claim 2, wherein the exchange rate information pertaining to one or more of the selected currencies accepted and authorized for use on the one or more selected slot machines or selected on or more gaming tables is displayed on a display thereof.

4. The casino management system of claim 1, wherein the information pertaining to the one or more banknotes or currencies that are not accepted for use by the respective selected one of the plurality of slot machines or the respective selected one or more of the table games is stored in the fourth non-transitory computer readable storage medium of the respective PTS terminal thereof.

5. The casino management system of claim 1, wherein when the respective currency reading device obtains currency type and currency amount information from the inserted banknote and transmits the currency amount and type information to the respective PTS terminal in communication with the respective currency reading device, the respective PTS terminal transmits the currency type and currency amount information to the slot machine management server, which compares the received currency type and currency amount information with the information pertaining to the one or more banknotes or currencies that are accept for use by the respective slot machine or the respective table game.

* * * * *